2,998,641
TITANIUM CARBIDE-SILVER COMPOSITIONS
Richard M. Atkinson, Reading, and Amos J. Shaler, State College, Pa., assignors to Stackpole Carbon Company, St. Marys, Pa., a corporation of Pennsylvania
No Drawing. Filed Jan. 29, 1959, Ser. No. 789,774
9 Claims. (Cl. 29—182.8)

This invention relates to articles comprising titanium carbide (TiC) distributed through a substantially continuous matrix of silver (Ag), and to a method of making such articles, and it is among its objects to provide such articles and a method of making them by powder metallurgy procedures that is simple and effective, and is productive of strong and dense articles.

This application is a continuation-in-part of our copending application filed June 21, 1956, Serial No. 592,752, now abandoned.

Articles composed of particles of a hard, high melting material, such as metallic carbides and borides, dispersed in a matrix of softer metal of lower melting point are produced in various ways, as by mixing powders of the two materials, forming compacts under pressure, and then heating in an appropriate atmosphere to a temperature below the melting point of the higher melting material. Another practice involves forming and heating compacts of the high melting material that forms the discontinuous phase of the article, and then introducing at an appropriate temperature the lower melting matrix material to infiltrate the sintered compact.

Electric contacts, especially those for heavy duty service involve interruption of high currents impressed at high voltages. TiC-Ag contacts would be desirable for such use but experience has shown that they cannot be made by conventional practices such, for instance, as those just described. For instance, titanium carbide (79.8–80.2% Ti, 19.2–19.6% C) passing a 325 mesh sieve was formed into compacts approximately 1" x 3/16" x 3/16" under a pressure of 20 tons per square inch that were heated fifteen minutes at 1050° C. under vacuum. They were then placed in graphite boats and heated in contact with silver (99.9% purity) in a hydrogen atmosphere for thirty minutes at 1100° C. The silver did not penetrate the carbide skeleton at all but rather balled up as soon as it was molten and ran off into the boat. In another test a mixture of equal parts by weight of the same titanium carbide and silver, both passing a 325 mesh sieve, were milled in carbon tetrachloride (CCl$_4$) to activate the surfaces of the particles, formed into the same size compacts under a pressure of 20 tons per square inch and heated in vacuum two minutes at 1000° C. Small balls of silver were found adhering to the compacts and lying in the bottom of the boat. The compacts were of very low strength. These tests show that molten silver wets titanium carbide very little, if at all under either of these procedures.

We have discovered, and it is upon this that the invention is largely predicated, that fully satisfactory wetting of titanium carbide by silver may be accomplished by infiltrating titanium carbide compacts with silver in the presence of titanium hydride (TiH$_2$) with production of articles of high strength and density and in which the particles of titanium carbide are well dispersed in and thoroughly wetted by silver constituting a continuous matrix phase.

As exemplifying the benefit of titanium hydride in effecting infiltration and wetting of titanium carbide by silver, reference may be made to one test in which strips of titanium metal in the form of sheet were carburized by heating to 1100° C. during 30 minutes in an atmosphere of hydrogen saturated with benzene (C$_6$H$_6$) vapor. Compacts of pure silver and of a mixture of silver and 5 percent by weight of titanium hydride were placed on top of the carburized strips. One set of the strips was then heated in vacuum to about 1000° C., and another set was heated to about 1100° C. in dry hydrogen. In both instances the pure silver balled up, showing lack of wetting, while in contrast the compacts of TiH$_2$-Ag produced a titanium-silver alloy that covered the TiC surfaces completely.

In the practice of the invention the titanium carbide and silver should be finely divided, the degree depending, of course, on the particular properties desired in the finished product. For most purposes they should be subdivided to pass a 100 mesh sieve, and most suitably a 325 mesh sieve.

Although titanium hydride acts to effect wetting of the carbide by the silver, it is preferable, we now believe, to activate the surfaces of the powders before compacting, as by milling them in a chlorinated liquid, such as carbon tetrachloride or other chlorinated hydrocarbon, in vapor of HCl or a halogen, or in contact with a halide adapted to release chlorine during the milling operation.

In one embodiment of the invention the titanium carbide and silver powders are mixed, compacted, heated and then infiltrated with a mixture of silver and titanium hydride. The compacting pressure will, as is known in the art, depend upon the properties, such as density, needed in the contact or other article being produced as well as upon its size. For most purposes pressing at 10 to 40 tons p.s.i. suffices. The compacts are heated at a temperature to cause a preliminary densification and a desirable distribution of the silver among the titanium carbide particles, for instance 1000° to 1050° C. The heating is to be conducted in an inert or reducing atmosphere because titanium carbide is reactive with nitrogen and oxygen. To this end the heating may be conducted under vacuum or in an atmosphere of hydrogen, argon, or other gas that is not reactive. The compacts thus produced are then infiltrated and sintered by contacting them with compacts of silver-titanium hydride and heating to an infiltrating temperature, for instance 1000° to 1100° C., again in hydrogen or other inert or reducing atmosphere.

As indicating the benefits to be derived from the invention, a mixture of equal parts by weight of titanium carbide and silver, both passing a 325 mesh sieve, were formed into compacts of the size described above, pressed under a pressure of 20 tons per square inch and heated in vacuo for 2 hours at 1000° C., after which they were placed in graphite boats in contact with compacts of silver and 5 percent by weight of titanium hydride and heated 60 minutes at 1100° C. in hydrogen. The resultant products showed a density before infiltration of 6.5 gm./cc. and transverse rupture strength after infiltration of 34,000 pounds per square inch.

As evidencing the benefits to be derived from preliminary surface activation, as referred to above, a similar mixture of titanium carbide and silver was milled in carbon tetrachloride, compacted, heated two hours at 1000° C. under vacuum, and then infiltrated in the same manner. The products had a density of 7.4 gm./cc. before infiltration and an average final transverse rupture strength of 73,000 pounds per square inch, and their microstructure consisted of a rather uniform distribution of the carbide particles in a titanium-silver alloy matrix that was relatively pore free. Analysis indicated that these latter contacts contained about 65 percent by volume of the matrix phase.

In another, and the preferred, embodiment of the invention the TiH$_2$ is mixed intimately with the Ag and TiC powders and compacts are pressed from the mixture. They are then placed in graphite or alumina boats and infiltrated and sintered by heating in an inert or reducing atmosphere, e.g., at 1100° C. In this way we have produced articles with strengths up to 100,000 p.s.i.

It will be observed that in both embodiments the compact is in contact with $TiH_2$ during infiltration.

We find that satisfactory results are to be had by the use of about 1 to 7 weight percent of $TiH_2$, and most suitably about 3 to 7 weight percent. The hydride decomposes, of course, to produce metallic titanium in an amount equivalent to the weight of $TiH_2$ used.

Similarly, proportions of the initial mixture of titanium carbide and silver used for preparing the compacts may be varied depending upon the ultimate properties desired, although we have found that mixtures of equal parts by weight of the two produce strong and dense products when processed in accordance with the invention. In the practice of the invention, however, there may be used from, by weight, 50 to 75 percent of silver, 50 to 25 percent of titanium carbide, with the preferred ranges being from 65 to 75 percent of silver, and the remainder titanium carbide. The final product will, as indicated, contain a small amount of Ti metal contributed by the $TiH_2$.

Products made according to the invention are useful, as indicated above, as electric contact elements although they may be used for other purposes.

The function of $TiH_2$ is not to supply hydrogen. Rather it supplies titanium in unoxidized form that wets the TiC particles and renders them wettable in turn by the molten silver. Thus, mixtures of TiC-Ag-$TiH_2$ are best infiltrated by silver, TiC-Ag-Ti compacts are fairly well infiltrated by silver, but compacts of TiC-Ag are not infiltrated by silver. Hence the Ti of $TiH_2$ is the essential factor, not its content of hydrogen.

In accordance with the provisions of the patent statutes, we have explained the principle and mode of practicing our invention and have described what we now consider to represent its best embodiment. However, we desire to have it understood that, within the scope of the appended claims, the invention may be practiced other than as specifically described.

We claim:

1. In a method of making a sintered body consisting essentially of silver and titanium carbide in which a pressed body of 50 to 75 weight percent Ag and 50 to 25 weight percent of TiC powders is infiltrated with a separate portion of silver, the step of heating said body to about 1000° to 1100° C. in contact with about 1 to 7 percent by weight of $TiH_2$ in an atmosphere inert to TiC during said infiltration to decompose the $TiH_2$ and thereby wetting the TiC with unoxidized titanium metal.

2. A method according to claim 1, said $TiH_2$ ranging from about 3 to 7 percent.

3. That method consisting essentially in the steps of forming a mixture of, by weight, about 50 to 25 percent of titanium carbide and the remainder substantially all finely divided silver, forming said mixture into compacts under high pressure, heating said compacts to about 1000° to 1100° C. in an atmosphere inert to titanium carbide, and heating the compacts again in contact with a mixture of silver and titanium hydride in one of said atmospheres at a temperature to decompose the $TiH_2$.

4. A method according to claim 3, said titanium carbide and silver substantially wholly passing a 100-mesh sieve.

5. A method according to claim 3, said titanium carbide and silver substantially wholly passing a 325-mesh sieve.

6. A method according to claim 3 in which said silver-titanium hydride mixture contains about 1 to 7 percent by weight of the hydride.

7. A method according to claim 3 in which said silver-titanium hydride mixture contains about 3 to 7 percent by weight of the hydride.

8. A new article of manufacture comprising a sintered body consisting essentially of titanium carbide particles embedded in and wetted by silver forming a continuous phase surrounding the titanium carbide particles, said silver ranging from about 50 to 75 percent and said carbide from about 50 to 25 percent, both by weight, with titanium metal present in an amount of about 1 to about 7 percent by weight.

9. An article according to claim 8, said titanium metal being about 3 to about 7 percent by weight.

References Cited in the file of this patent

UNITED STATES PATENTS

| | | |
|---|---|---|
| 1,984,203 | Sieger | Dec. 11, 1934 |
| 2,739,375 | Coxe | Mar. 27, 1956 |
| 2,895,822 | Peras | July 21, 1959 |

FOREIGN PATENTS

| | | |
|---|---|---|
| 513,270 | Great Britain | Oct. 9, 1939 |